(12) United States Patent
Jorge Coelho Marques et al.

(10) Patent No.: US 11,547,982 B2
(45) Date of Patent: Jan. 10, 2023

(54) CERIUM- AND ZIRCONIUM-BASED MIXED OXIDE

(71) Applicant: RHODIA OPERATIONS, Paris (FR)

(72) Inventors: Rui Miguel Jorge Coelho Marques, Shanghai (CN); Simon Ifrah, La Jarrie (FR); Boris Chabert, La Jarne (FR)

(73) Assignee: RHODIA OPERATIONS, Paris (FR)

( * ) Notice: Subject to any disclaimer, the term of this patent is extended or adjusted under 35 U.S.C. 154(b) by 284 days.

(21) Appl. No.: 16/096,280

(22) PCT Filed: Apr. 25, 2017

(86) PCT No.: PCT/FR2017/050984
§ 371 (c)(1),
(2) Date: Oct. 24, 2018

(87) PCT Pub. No.: WO2017/187085
PCT Pub. Date: Nov. 2, 2017

(65) Prior Publication Data
US 2019/0168188 A1 Jun. 6, 2019

(30) Foreign Application Priority Data
Apr. 26, 2016 (FR) ...................................... 1653698

(51) Int. Cl.
*B01J 23/10* (2006.01)
*C01G 25/00* (2006.01)
(Continued)

(52) U.S. Cl.
CPC ............ *B01J 23/10* (2013.01); *B01D 53/945* (2013.01); *B01J 21/066* (2013.01); *B01J 23/14* (2013.01); *B01J 23/464* (2013.01); *B01J 35/109* (2013.01); *B01J 35/1014* (2013.01); *B01J 35/1061* (2013.01); *B01J 35/1066* (2013.01); *B01J 37/009* (2013.01); *B01J 37/0018* (2013.01); *B01J 37/0036* (2013.01); *B01J 37/0215* (2013.01); *B01J 37/038* (2013.01); *B01J 37/04* (2013.01); *B01J 37/06* (2013.01); *B01J 37/08* (2013.01); *C01G 25/006* (2013.01);
(Continued)

(58) Field of Classification Search
None
See application file for complete search history.

(56) References Cited

U.S. PATENT DOCUMENTS

| | | | | |
|---|---|---|---|---|
| 6,506,705 B2 * | 1/2003 | Blanchard | ............... | C01G 25/00 502/300 |
| 2010/0040523 A1 * | 2/2010 | Larcher | .................... | B01J 23/10 423/213.2 |

(Continued)

FOREIGN PATENT DOCUMENTS

| | | | |
|---|---|---|---|
| EP | 2868369 A1 | 5/2015 | |
| FR | 2955098 A1 | 7/2011 | |
| WO | 2011138255 A2 | 11/2011 | |

*Primary Examiner* — Colin W. Slifka
*Assistant Examiner* — Michael Forrest
(74) *Attorney, Agent, or Firm* — Osha Bergman Watanabe & Burton LLP

(57) ABSTRACT

The invention relates to a mixed oxide composed of zirconium, cerium, lanthanum and at least one rare earth oxide other than cerium and lanthanum, having a specific porosity and a high specific surface area; to the method for preparing same and to the use thereof in catalysis.

26 Claims, 6 Drawing Sheets

(51) Int. Cl.
 *B01D 53/94* (2006.01)
 *B01J 21/06* (2006.01)
 *B01J 23/14* (2006.01)
 *B01J 23/46* (2006.01)
 *B01J 35/10* (2006.01)
 *B01J 37/00* (2006.01)
 *B01J 37/02* (2006.01)
 *B01J 37/03* (2006.01)
 *B01J 37/04* (2006.01)
 *B01J 37/06* (2006.01)
 *B01J 37/08* (2006.01)
 *F01N 3/10* (2006.01)

(52) U.S. Cl.
 CPC ........ *F01N 3/10* (2013.01); *B01D 2255/2061* (2013.01); *B01D 2255/2065* (2013.01); *B01D 2255/2094* (2013.01); *B01D 2255/20715* (2013.01); *B01D 2255/407* (2013.01); *C01P 2002/50* (2013.01); *C01P 2004/51* (2013.01); *C01P 2004/61* (2013.01); *C01P 2004/62* (2013.01); *C01P 2006/12* (2013.01); *C01P 2006/13* (2013.01); *C01P 2006/14* (2013.01); *C01P 2006/16* (2013.01); *C01P 2006/17* (2013.01); *F01N 2370/02* (2013.01)

(56) References Cited

U.S. PATENT DOCUMENTS

| | | | |
|---|---|---|---|
| 2012/0189517 A1* | 7/2012 | Ifrah | B01D 53/945 423/213.2 |
| 2013/0052108 A1 | 2/2013 | Ifrah et al. | |
| 2013/0142713 A1* | 6/2013 | Ifrah | B01D 53/9413 423/213.2 |

* cited by examiner

CERIUM- AND ZIRCONIUM-BASED MIXED OXIDE

CROSS-REFERENCE TO RELATED APPLICATIONS

The present application is a U.S. national phase entry under 35 U.S.C. § 371 of International Application No. PCT/FR2017/050984, filed on 25 Apr. 2017, which claims priority to French Application No. 1653698, filed on 26 Apr. 2016, the entire content of each of these applications is explicitly incorporated herein by reference.

TECHNICAL FIELD

The present invention relates to a mixed oxide of zirconium, of cerium, of lanthanum and of at least one oxide of a rare earth metal other than cerium and lanthanum exhibiting a high specific porosity and a high specific surface, to its process of preparation and to its use in catalysis.

TECHNICAL PROBLEM

"Multifunctional" catalysts are currently used for the treatment of exhaust gases from internal combustion engines (motor vehicle afterburning catalysis). Multifunctional is understood to mean catalysts capable of carrying out not only oxidation, in particular of carbon monoxide and hydrocarbons present in exhaust gases, but also reduction, in particular of nitrogen oxides also present in these gases ("three-way" catalysts).

The catalyst results from the interaction of a precious metal (for example Pd, Pt, Rh) with a mixed oxide based on cerium and on zirconium, often as a mixture with alumina. The mixed oxide has to exhibit a suitable porosity. Thus, it has to exhibit a pore volume which is sufficiently large and also to comprise pores with a size sufficiently great to make possible good diffusion of the gases. The mixed oxide also has to exhibit a specific surface sufficiently high to be usable in catalysis.

It is known that small-sized pores develop the most specific surface. In point of fact it is these pores which are the most sensitive to sintering. It is thus advantageous to develop a mixed oxide exhibiting a good compromise between a high pore volume, a high surface area, even after maintaining at a high temperature, and for which there exists a population of small-sized pores which exhibits a good thermal resistance.

The mixed oxide according to the invention as described in claim 1 is targeted at such a compromise.

Other characteristics, details and advantages of the invention will become even more fully apparent on reading the description and the appended figures.

BRIEF DESCRIPTION OF THE DRAWINGS

FIGS. 1 and 2: curves (C) for the mixed oxide of example 1:
FIG. 1 after calcination at 900° C. for 4 h;
FIG. 12 after calcination at 1100° C. for 4 h.
FIGS. 3 and 4: curves (C) for the mixed oxide of comparative example 17:
FIG. 3 after calcination at 900° C. for 4 h;
FIG. 4 after calcination at 1100° C. for 4 h.
FIGS. 5 and 6: curves (C) for the mixed oxide of comparative example 18:
FIG. 5 after calcination at 900° C. for 4 h;
FIG. 6 after calcination at 1100° C. for 4 h.
FIGS. 7 and 8: curves (C) for the mixed oxide of comparative example 22:
FIG. 7 after calcination at 950° C. for 3 h;
FIG. 8 after calcination at 1100° C. for 4 h.
FIGS. 9 and 10: curves (C) for the mixed oxide of example 10:
FIG. 9 after calcination at 950° C. for 3 h;
FIG. 10 after calcination at 1100° C. for 4 h.
FIGS. 11 and 12: curves (C) for the mixed oxide of example 6:
FIG. 11 after calcination at 900° C. for 4 h;
FIG. 12 after calcination at 1100° C. for 4 h.

DEFINITIONS

Figure 1:
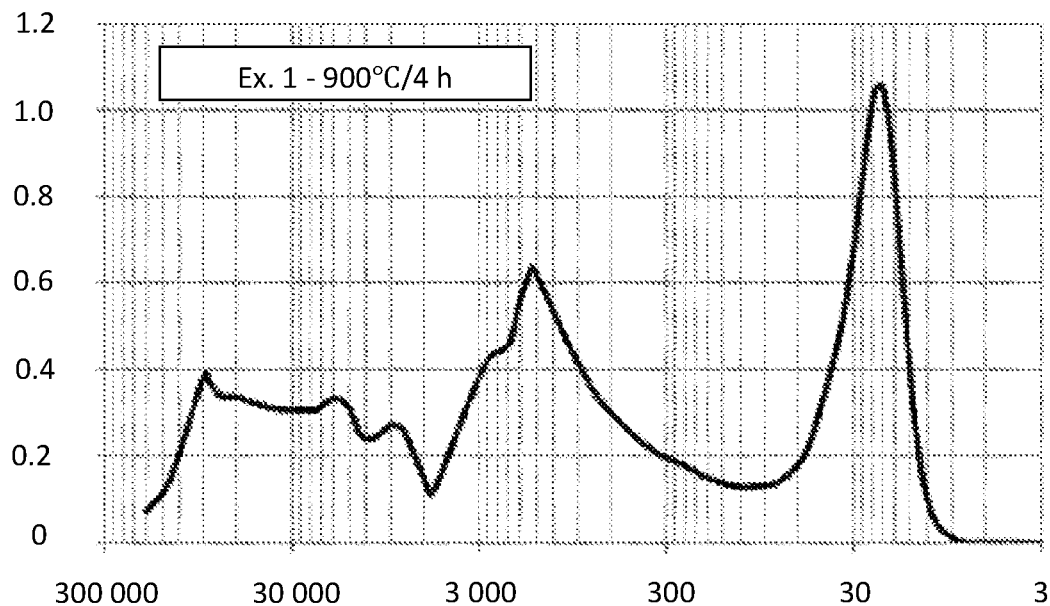
FIGS. 1 to 12 represent derivative curves (C) giving dV/dlog D as a function of D for several mixed oxides.
Figure 2:
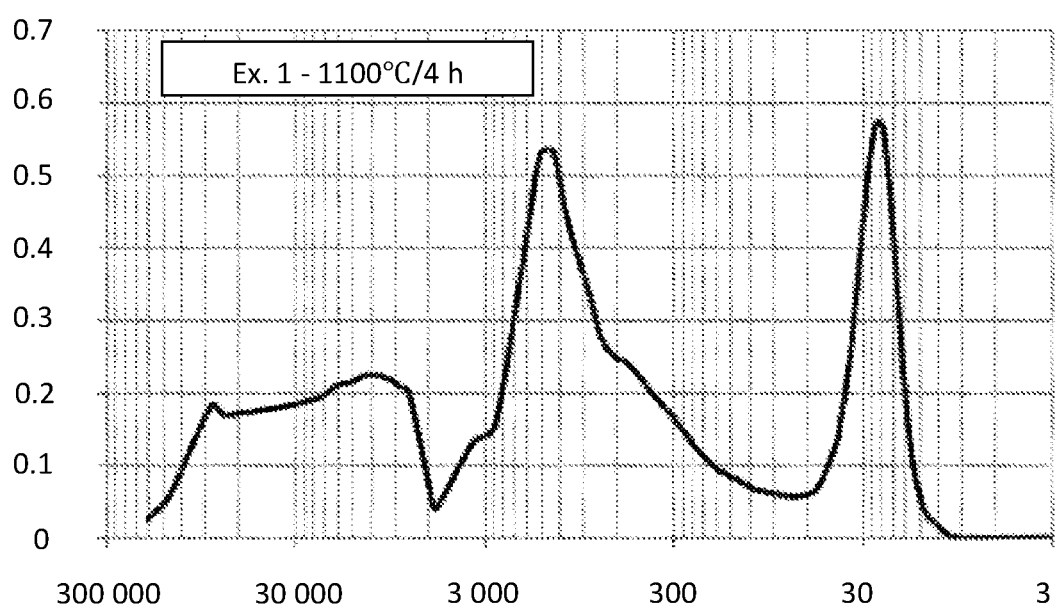
Figure 3:
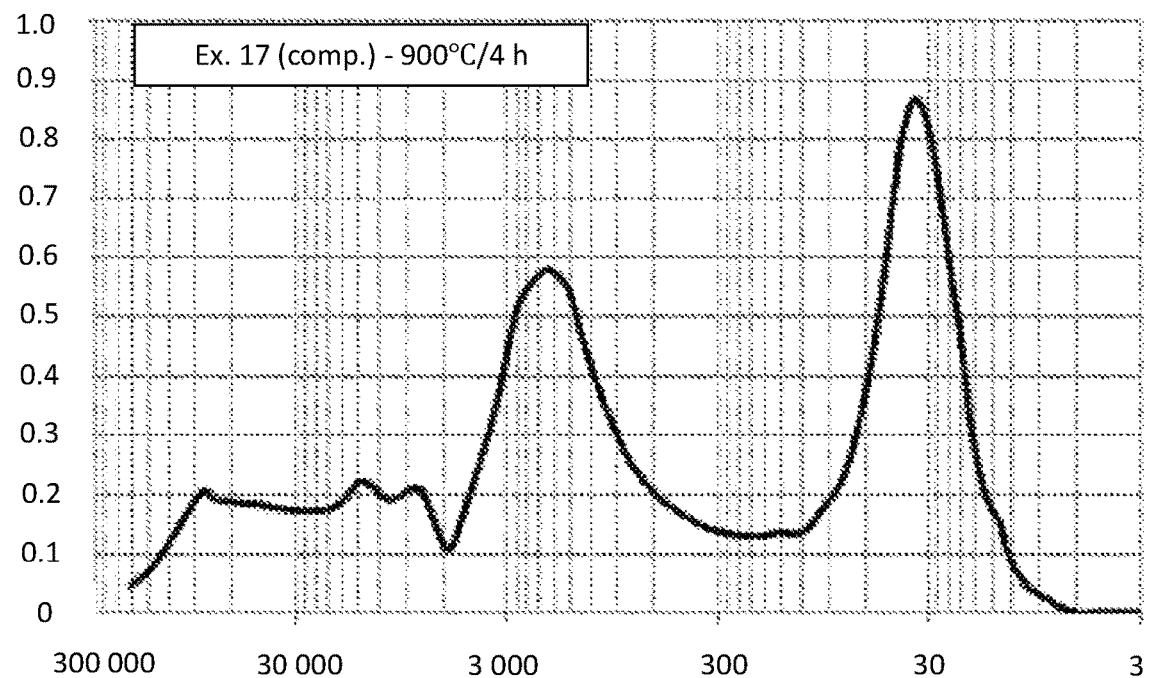
Figure 4:
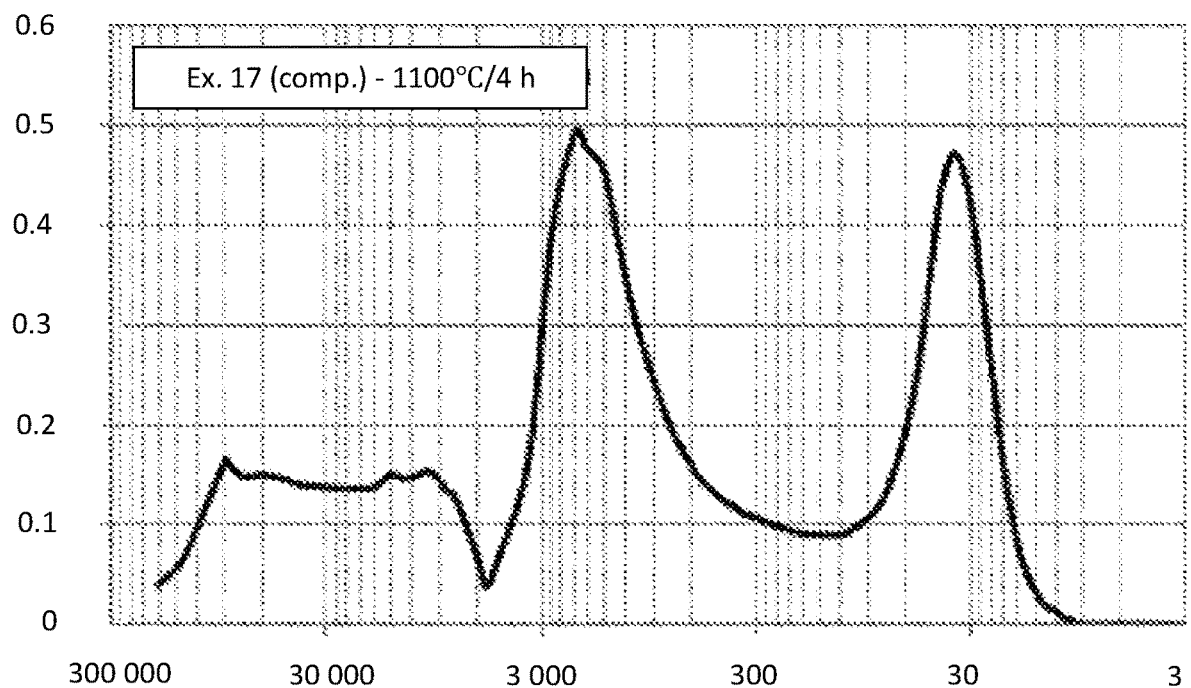
Figure 5:
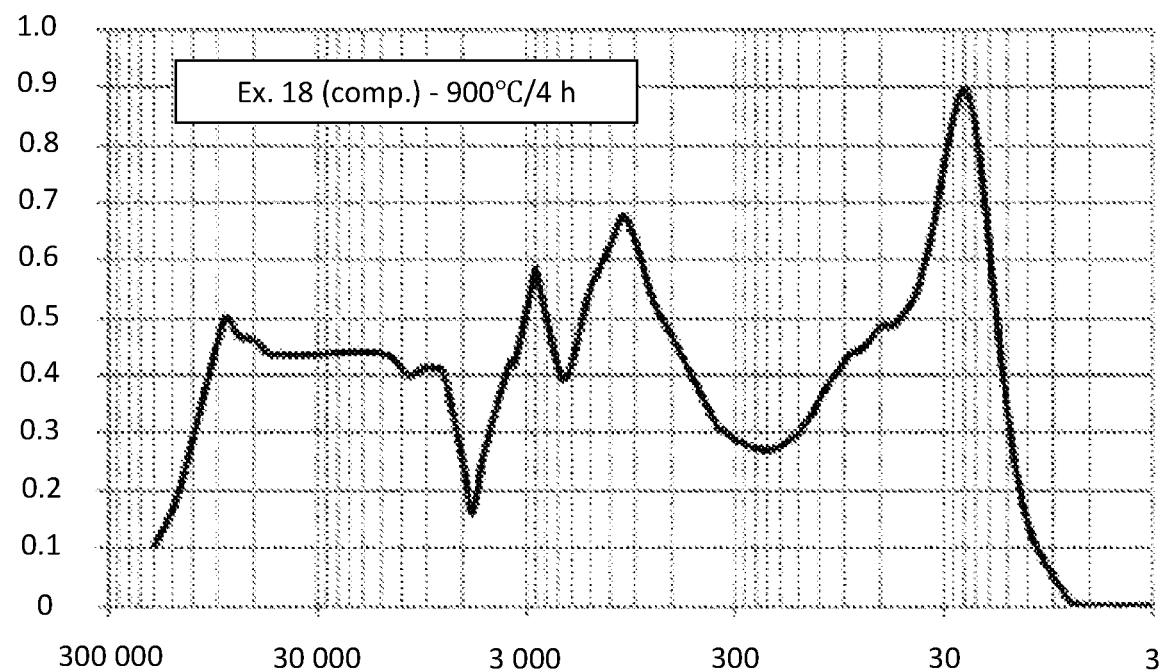
Figure 6:
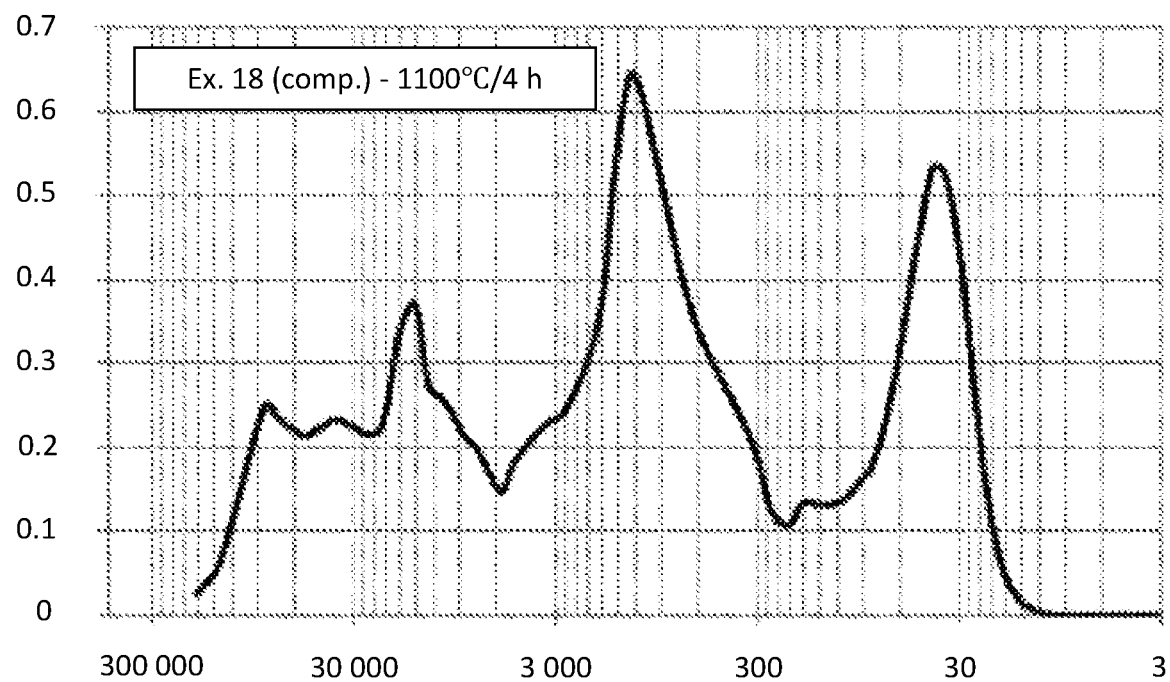
Figure 7:
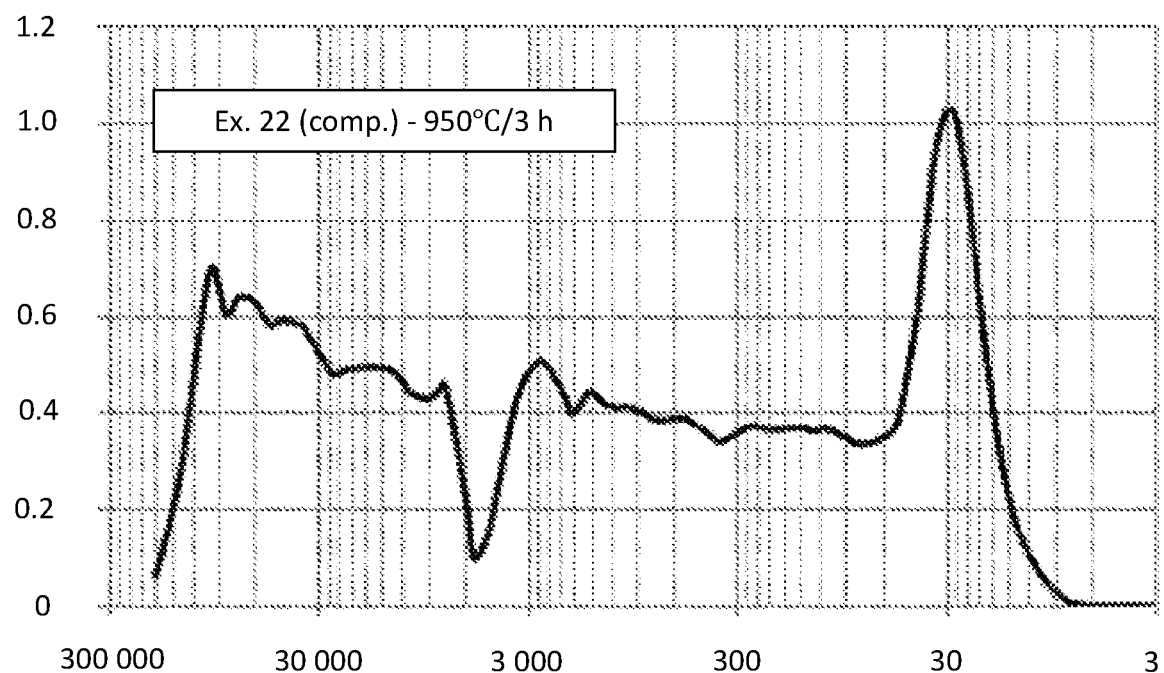
Figure 8:
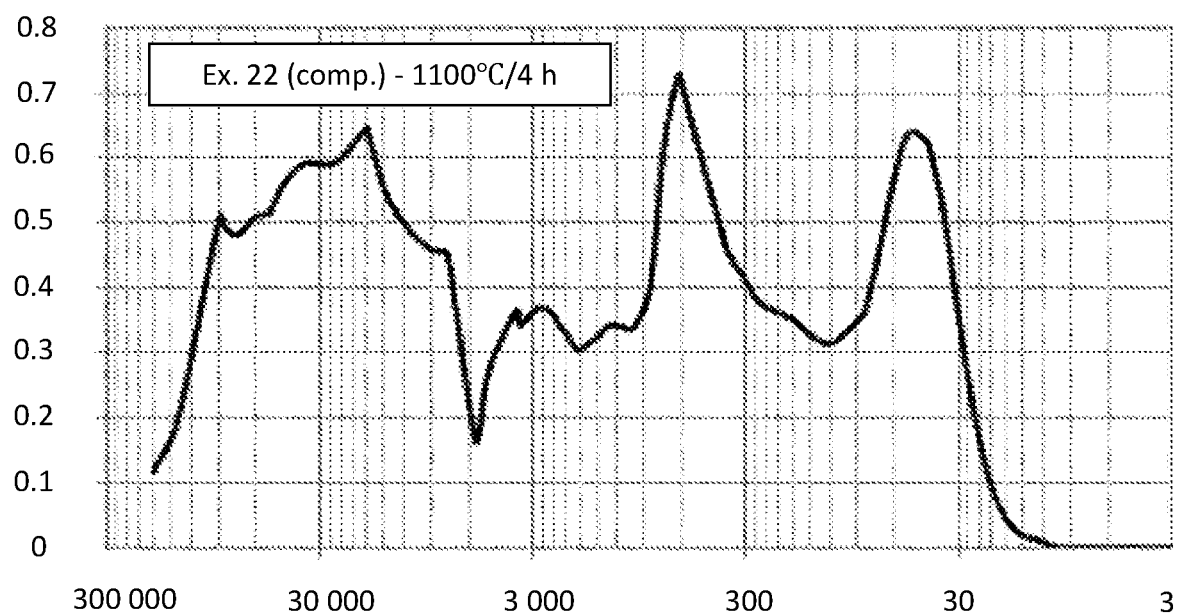
Figure 9:
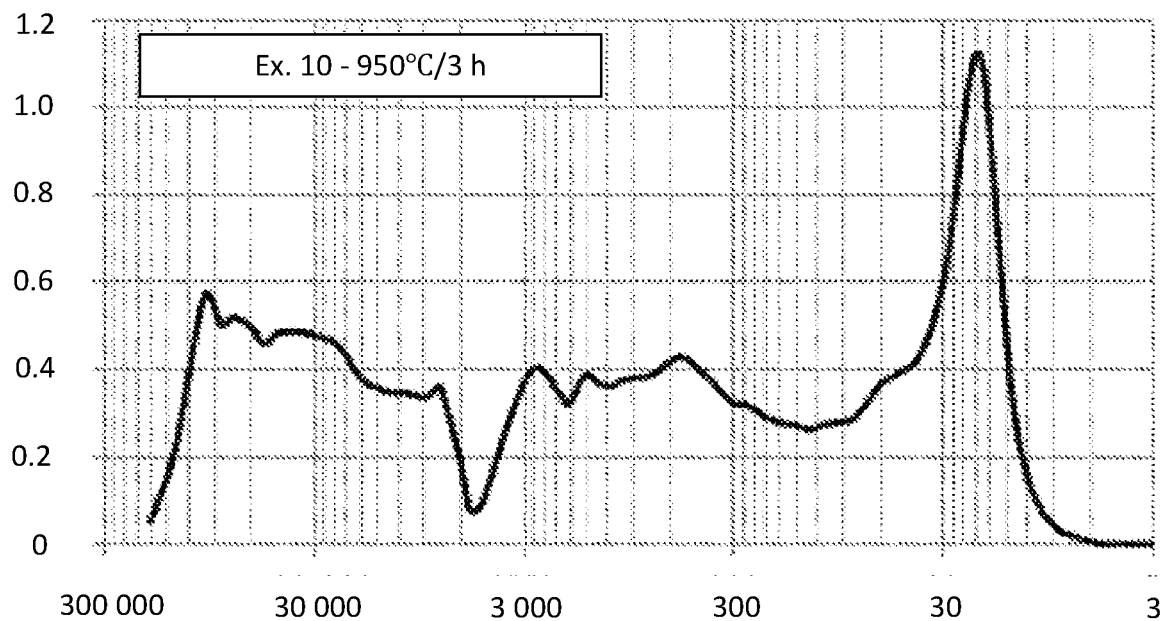
Figure 10:
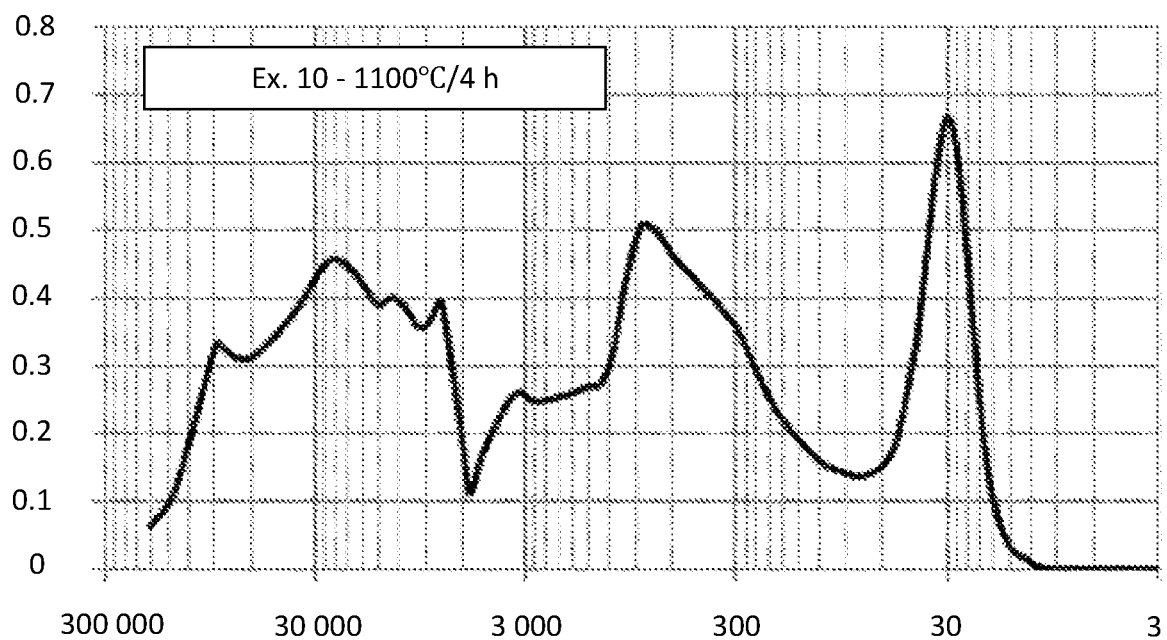
Figure 11:
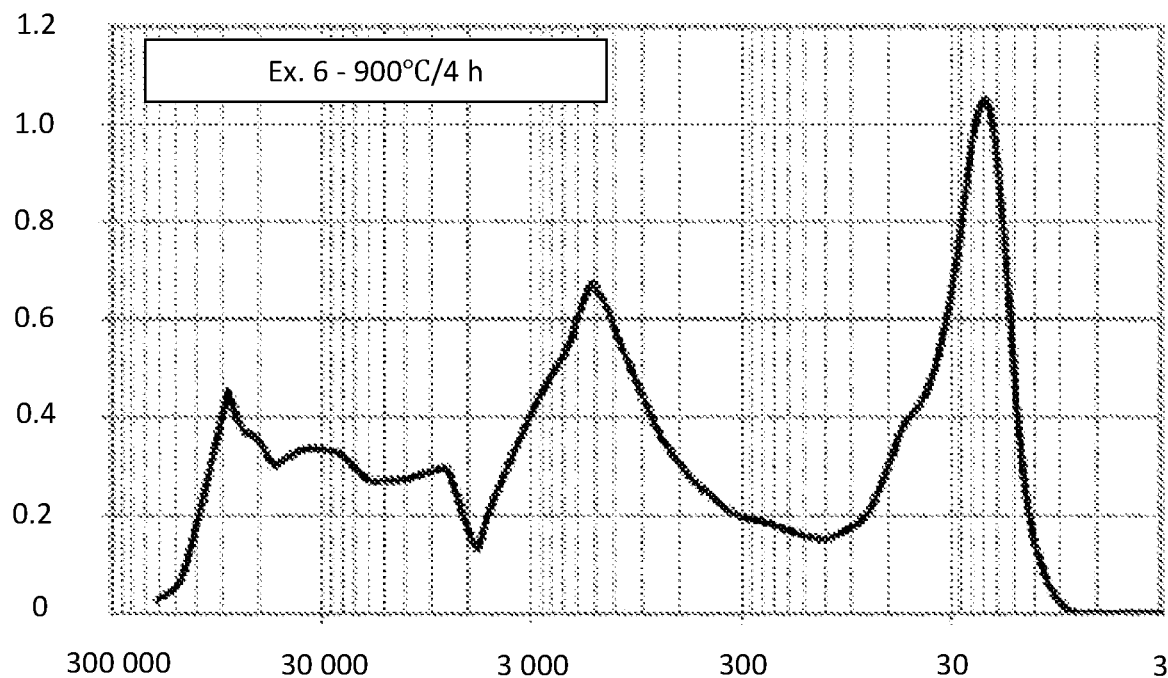
Figure 12:
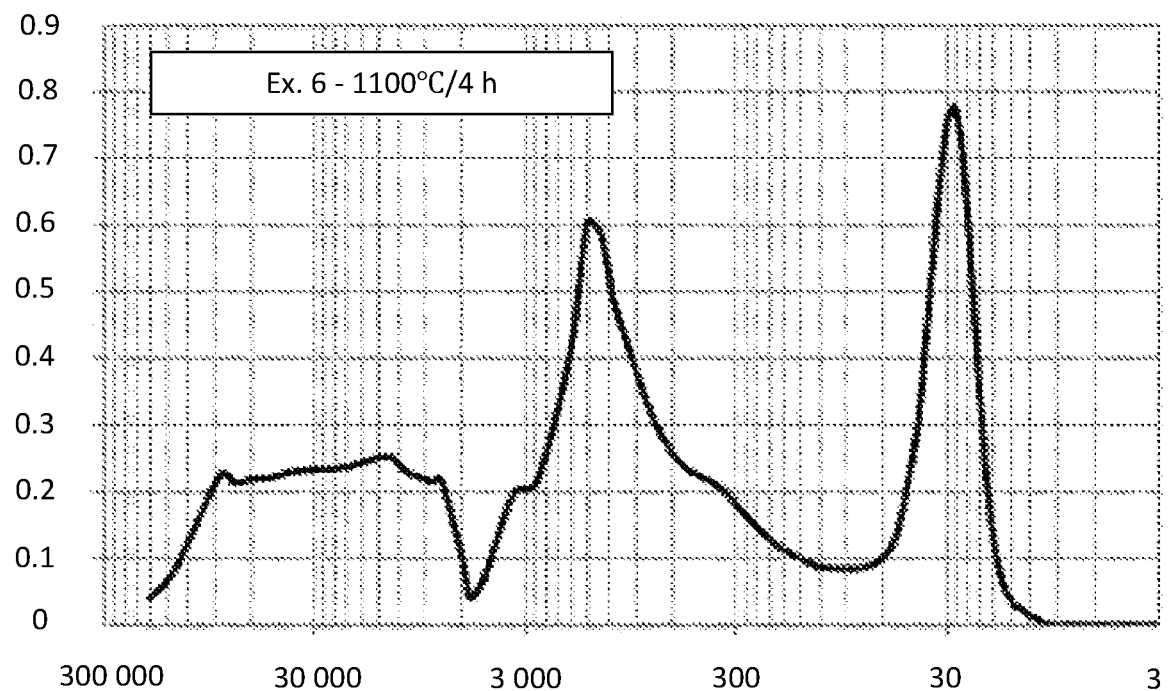

Specific surface is understood to mean the BET specific surface determined by nitrogen adsorption. This is obtained in accordance with the standard ASTM D3663-03 drawn up from the Brunauer-Emmett-Teller method described in the periodical "The Journal of the American Chemical Society", 60, 309 (1938). The abbreviation $S_{T(° C.)/x\,(h)}$ is used to denote the specific surface of a composition, obtained by the BET method as described above, after calcination of the composition at a temperature T, expressed in ° C., for a period of time of x hours. For example, $S_{1000°\,C./4\,h}$ denotes the BET specific surface of a composition after calcination of the latter at 1000° C. for 4 h. The calcinations for a given temperature and a given period of time correspond, unless otherwise indicated, to calcinations under air at a stationary temperature over the period of time indicated. It is possible to use a Tristar II 3020 device from Micromeritics on samples by conforming to the instructions recommended by the manufacturer.

The porosities indicated are measured by mercury intrusion porosimetry in accordance with the standard ASTM D 4284-83 ("Standard method for determining pore volume distribution of catalysts by mercury intrusion porosimetry"). It is possible to use a Micromeritics Autopore IV 9500 device provided with a powder penetrometer by conforming to the instructions recommended by the manufacturer.

Mercury intrusion porosimetry makes it possible to obtain the pore volume (V) as a function of the pore diameter (D). From these data, it is possible to obtain the curve (C) representing the derivative (dV/dlog D) of the function V as a function of log D. The derivative curve (C) may exhibit one or more peaks each located at a diameter denoted $D_p$. The pores which are regarded as characteristics for the invention are those exhibiting a diameter of less than or equal to 200 nm.

Rare earth metal is understood to mean the elements of the group consisting of yttrium and the elements of the Periodic Table with an atomic number between 57 and 71 inclusive.

The proportions are given as weight of oxide, unless otherwise indicated. It is considered for this that cerium oxide is in the form of ceric oxide ($CeO_2$), that the oxides of the other rare earth metals are in the form $REM_2O_3$, REM denoting the rare earth metal (with the exception of praseodymium, expressed in the form $Pr_6O_{11}$), and that zirconium oxide and hafnium oxide are in the forms $ZrO_2$ and $HfO_2$.

It is specified, for the continuation of the description, that, unless otherwise indicated, in the ranges of values which are given, the values at the limits are included.

TECHNICAL BACKGROUND

WO 2011/006780 describes compositions based on cerium oxide and on zirconium oxide exhibiting, after calcination at 900° C. for 4 h, two very distinct populations of pores. The surface $S_{1100°\ C./4\ h}$ is at least 15 m²/g according to one embodiment. In the examples, this surface is at most 19 m²/g.

WO 2011/138255 describes compositions based on zirconium, cerium and yttrium oxides which exhibit, after calcination at 900° C. for 4 h, two very distinct populations of pores. After calcination at 1100° C. for 4 h, they exhibit a population of pores for which the diameter is centered on a value of between 30 and 70 nm, more particularly around 50 nm. The surface $S_{1100°\ C./4\ h}$ is at least 25 m²/g, more particularly at least 27 m²/g. In the examples, the maximum value of $S_{1100°\ C./4\ h}$ is 33 m²/g and that of $S_{1000°\ C./4\ h}$ is 50 m²/g. The mixed oxides of the present invention are characterized by a higher surface $S_{1000°\ C./4\ h}$, of greater than 55 m²/g.

WO 2012/072439 describes compositions based on oxides of zirconium and of a rare earth metal other than cerium which exhibit a surface $S_{1100°\ C./4\ h}$ of at least 25 m²/g, more particularly of at least 27 m²/g. It is indicated that it is possible to obtain a specific surface ranging up to 37 m²/g. In the examples, the maximum value of $S_{1100°\ C./4\ h}$ is 33 m²/g. These compositions do not contain cerium (page 2, line 29). The mixed oxides of the present invention are characterized by a much higher surface $S_{1000°\ C./4\ h}$, of greater than 55 m²/g.

WO 2011/083157 describes compositions based on oxides of zirconium, of cerium and of at least one rare earth metal other than cerium which exhibit a $S_{1000°\ C./6\ h}$ of at least 45 m²/g, more particularly still of at least 55 m²/g. The surfaces $S_{1100°\ C./4\ h}$ of the compositions of table 1 are, however, less than 25 m²/g.

WO 2004/002893 describes a composition based on oxides of zirconium, of cerium, of lanthanum and of a rare earth metal other than cerium. The surface $S_{1000°\ C./6\ h}$ is at least 40 m²/g, more particularly at least 55 m²/g. The surface $S_{1100°\ C./6\ h}$ is at least 20 m²/g. The example of this patent application is a composition $ZrO_2$ (73.5%)/$CeO_2$ (20%)/$La_2O_3$ (2.5%)/$Nd_2O_3$ (4%) exhibits a surface $S_{1000°\ C./10\ h}$ of 55 m²/g and a surface $S_{1100°\ C./10\ h}$ of 23 m²/g.

WO 2014/1221402 describes compositions based on oxides of zirconium, of cerium, of lanthanum, of yttrium or gadolinium and of tin (1-15%) which exhibit a $S_{1000°\ C./6\ h}$ of at least 45 m²/g, indeed even of at least 60 m²/g, and a surface $S_{1100°\ C./6\ h}$ of at least 25 m²/g, indeed even of at least 40 m²/g.

WO 07093593 describes compositions based on oxides of zirconium, of cerium, of yttrium, of lanthanum and of a rare earth metal other than cerium and lanthanum which may exhibit, for one of the two alternative forms, a surface $S_{1000°\ C./4\ h}$ of at least 30 m²/g. These compositions comprise a proportion by weight of yttrium oxide of between 10% and 25% and a proportion by weight of oxide of the additional rare earth metal of between 2% and 15%. All the examples comprise a proportion of rare earth metal other than cerium and lanthanum which is greater than 15% by weight.

WO 2009/130202 describes compositions based on oxides of zirconium, of cerium and of yttrium, the proportion of cerium oxide of which is at most 15% by weight.

WO 2012/171947 describes compositions based on oxides of cerium, of zirconium and of at least one rare earth metal other than cerium having a content of cerium oxide of greater than 50% by weight. The mixed oxides of the present invention have a proportion of cerium of less than 45%.

WO 03037506, EP 0 955 267, EP 1 621 251 and U.S. Pat. No. 7,927,699 describe compositions, the specific surfaces of which are not as high as for the mixed oxides of the present invention.

EP 2 868 369 describes the preparation of a mixed oxide 40% $CeO_2$, 50% $ZrO_2$, 5% $Pr_2O_3$ and 5% $La_2O_3$ using a micromixing tool. However, neither the specific surface nor the porosity of the mixed oxide is mentioned in this document.

FR 2 955 098 describes mixed oxides. No reference is made to the characteristics of porosity of the mixed oxide as claimed in claim 1.

DETAILED DESCRIPTION

As regards the mixed oxide according to the invention, the latter is a mixed oxide of zirconium, of cerium, of lanthanum and optionally of at least one rare earth metal other than cerium and lanthanum (denoted REM), the proportions by weight of these elements, expressed as oxide equivalent, with respect to the total weight of the mixed oxide being as follows:

between 8% and 45% of cerium;
between 1% and 10% of lanthanum;
between 0% and 15% of the rare earth metal other than cerium and lanthanum;
the remainder as zirconium,
characterized in that the mixed oxide exhibits:
after calcination at a temperature of 1100° C. for 4 hours, a BET specific surface of at least 30 m²/g;
after calcination at a temperature of 1000° C. for 4 hours, a BET specific surface of at least 55 m²/g;
and in that the derivative curve (dV/dlog D) obtained by mercury porosimetry on the mixed oxide after calcination at a temperature of 1100° C. for 4 hours exhibits, in the range of the pores with a diameter of less than or equal to 200 nm, a peak for which the maximum corresponds to a pore diameter $D_{p,1100°\ C./4\ h}$ of between 24 and 34 nm, V and D respectively denoting the pore volume and the pore diameter.

The abovementioned elements Ce, La, REM and Zr are generally present in the form of oxides. However, it is not excluded for them to be able to be present at least partly in the form of hydroxides or of oxyhydroxides. The proportions of these elements may be determined using analytical techniques conventional in laboratories, in particular X-ray fluorescence, for example by using the PANalytical Axios-Max spectrometer. The proportions of these elements are given by weight of oxide equivalent with respect to the total weight of the mixed oxide.

The mixed oxide comprises the abovementioned elements in the proportions indicated but it may also comprise other elements, such as, for example, impurities. The impurities may originate from the starting materials or from the starting reactants used. The total proportion of the impurities is generally less then 0.1%, expressed by weight with respect to the total weight of the mixed oxide. The mixed oxide may also comprise hafnium, which is generally present in association with zirconium in natural ores. The proportion of hafnium with respect to the zirconium depends on the ore from which the zirconium is extracted. The Zr/Hf proportion by weight in some ores may thus be of the order of 50/1. Thus, for example, baddeleyite contains approximately 98% of zirconium oxide for 2% of hafnium oxide. Like zirconium, hafnium is generally present in the oxide form.

However, it is not excluded for it to be able to be present at least partly in the hydroxide or oxyhydroxide form. The proportion by weight of hafnium in the mixed oxide is less than or equal to 2.5%, even 2.0%, expressed as oxide equivalent with respect to the total weight of the mixed oxide. The proportions of the impurities may be determined using inductively coupled plasma mass spectrometry (ICP-MS).

According to an alternative form, for which the characteristics and embodiments described below also apply, the mixed oxide consists of a mixture of oxides of zirconium, of cerium, of lanthanum, optionally of at least one rare earth metal other than cerium and lanthanum (REM) and optionally of hafnium, the proportions by weight of said oxides being as follows:

between 8% and 45% of cerium oxide;
between 1% and 10% of lanthanum oxide;
between 0% and 15% of at least one rare earth metal oxide, the rare earth metal being other than cerium and lanthanum;
between 0% and 2.5% of hafnium oxide;
the remainder as zirconium oxide,
characterized in that the mixed oxide exhibits:
after calcination at a temperature of 1100° C. for 4 hours, a BET specific surface of at least 30 m²/g;
after calcination at a temperature of 1000° C. for 4 hours, a BET specific surface of at least 55 m²/g;
and in that the derivative curve (dV/dlog D) obtained by mercury porosimetry on the mixed oxide after calcination at a temperature of 1100° C. for 4 hours exhibits, in the range of the pores with a diameter of less than or equal to 200 nm, a peak for which the maximum corresponds to a pore diameter $D_{p,1100°\ C./4\ h}$ of between 24 and 34 nm, V and D respectively denoting the pore volume and the pore diameter.

The mixed oxide may also comprise tin in the oxide form $SnO_2$ in a proportion by weight, as oxide equivalent, with respect to the total weight of the mixed oxide, of strictly less than 1.0%, indeed even of less than 0.01%. Preferably, the mixed oxide does not contain tin.

The proportion by weight of cerium is between 8% and 45% and more particularly between 18% and 45%. This proportion may also be between 8% and 12%.

The proportion by weight of lanthanum is between 1% and 10% and more particularly between 2% and 9%.

The mixed oxide may also comprise between 0% and 15% by weight of at least one rare earth metal other than cerium or lanthanum (REM). The rare earth metal may be chosen from yttrium, neodymium or praseodymium.

The mixed oxide also comprises zirconium. The proportion by weight of the zirconium is as remainder to 100% of the other elements of the mixed oxide. According to one embodiment, the zirconium is, putting aside oxygen, the predominant element, that is to say the proportion by weight as oxide equivalent of which is greater than the proportion by weight as oxide equivalent of each of the other constituent elements of the mixed oxide (that is to say, Ce, La and, if appropriate, REM, Hf and Sn). According to another embodiment, the proportion by weight of zirconium may be between 40% and 91%.

According to one embodiment, the oxide does not comprise a rare earth metal other than cerium and lanthanum. According to this embodiment, the proportion by weight of cerium may be between 30% and 40% and that of lanthanum between 3% and 6%. The remainder as zirconium may be between 54% and 67% by weight.

According to another embodiment, the mixed oxide comprises only yttrium as rare earth metal other than cerium and lanthanum. According to this embodiment, the proportion of yttrium may be between 1% and 15% and more particularly between 1% and 13%. The proportion of cerium may be between 20% and 40%.

According to another embodiment, the mixed oxide comprises only two rare earth metals other than cerium and lanthanum, which may be yttrium and neodymium or else yttrium and praseodymium. The proportion of yttrium may be between 1% and 10% by weight and that of neodymium or praseodymium between 2% and 6%.

The following constituent elements of the mixed oxide may be as follows:
zirconium and optionally hafnium, cerium, lanthanum, yttrium; or
zirconium and optionally hafnium, cerium, lanthanum, yttrium, neodymium; or
zirconium and optionally hafnium, cerium, lanthanum, yttrium, praseodymium;
or
zirconium and optionally hafnium, cerium, lanthanum.

According to one embodiment, the mixed oxide may exhibit a single phase only after calcination at 900° C./4 h and/or at 1100° C./4 h. This single phase may be a cubic or tetragonal phase.

According to another embodiment, it is possible to distinguish, after calcination at 900° C./4 h, the presence of several crystallographic phases, one of which is cubic or else tetragonal. According to another embodiment, it is possible to distinguish, after calcination at 1100° C./4 h, the presence of several crystallographic phases, one of which is cubic or else tetragonal.

An important characteristic of the mixed oxide is that it exhibits a specific porosity after calcination at 1100° C. for 4 hours. Thus, after calcination at a temperature of 1100° C. for 4 hours, it is possible to distinguish, on the derivative curve (C) in the range of the pores with a diameter of less than or equal to 200 nm, a peak for which the maximum corresponds to a pore diameter, denoted $D_{p,1100°\ C./4\ h}$, of between 24 nm and 34 nm. According to one embodiment, $D_{p,1100°\ C./4\ h}$ is between 24 nm and 30 nm, this upper value being excluded (in other words, $D_{p,1100°\ C./4\ h}$ is greater than or equal to 24 nm and strictly less than 30 nm).

After calcination at 1100° C. for 4 h, the mixed oxide may be such that the pore volume developed by the pores around the diameter $D_{p,1100°\ C./4\ h}$ represents a major portion of the pore volume which is developed by the pores for which the diameter is less than or equal to 200 nm. This may be demonstrated using the ratio R, which is defined by the formula below:

$$R = \frac{V_1}{V_2}$$

in which:
$V_1$ is the pore volume developed by the pores for which the diameter in nm is between ($D_{p,1100°\ C./4\ h}$−15) and ($D_{p,1100°\ C./4\ h}$+15);
$V_2$ is the pore volume developed by the pores for which the diameter is less than or equal to 200 nm;
$V_1$ and $V_2$ being determined by mercury porosimetry on the mixed oxide after calcination at 1100° C. for 4 h.
In the range of the diameters of less than or equal to 200 nm, the pore volume which is developed corresponds to the inter- and intraparticle pore volume. For this reason, the pore volume indicated here corresponds to the inter- and intraparticle pore volume as it is deduced from the volume values given by the device.

The ratio R makes it possible to assess the portion of the pore volume developed by the population of "small" pores. The value of 15 nm selected for the ratio R is close to the half-height width of the peaks observed. The higher R is, the more the distribution by volume of the pores is tightened around the "small" pores around $D_{p,1100°\ C./4\ h}$, that is to say for which the diameter in nm is between $(D_{p,1100°\ C./4\ h}-15)$ and $(D_{p,1100°\ C./4\ h}+15)$. This ratio R is greater than 0.60. It may be greater than 0.65, indeed even than 0.70. It is possible to achieve a value R of 0.90, as may be seen for example 8. The ratio R may thus be between 0.60 and 0.90, between 0.65 and 0.90, and even between 0.70 and 0.90.

According to another embodiment, the derivative curve (dV/dlog D) obtained by mercury porosimetry on the mixed oxide after calcination at a temperature of 900° C. for 4 hours exhibits, in the range of the pores with a diameter of less than or equal to 200 nm, a peak for which the maximum corresponds to a pore diameter denoted $D_{p,900°\ C./4\ h}$ and such that the difference in absolute value $D_{p,1100°\ C./4\ h}-D_{p,900°\ C./4\ h}$ is less than or equal to 15 nm, indeed even less than or equal to 10 nm. This reflects the fact that the population of the pores which develops the pore volume in the range of the pores with a diameter of less than or equal to 200 nm is not greatly affected by the sintering.

According to one embodiment, after calcination at 900° C. for 4 h, the mixed oxide does not exhibit, on the curve (C), two distinct peaks within the range of the pores for which the diameter is less than or equal to 200 nm.

The mixed oxide is also characterized by a high specific surface, as a result in particular of its specific porosity. Thus, it exhibits a surface $S_{1100°\ C./4\ h}$ of at least 30 m²/g, more particularly of at least 32 m²/g, indeed even of at least 35 m²/g. It is possible to achieve a value of 40 m²/g. This specific surface may be between 30 and 40 m²/g.

The mixed oxide also exhibits a surface $S_{1000°\ C./4\ h}$ of at least 55 m²/g, more particularly of at least 58 m²/g. It is possible to achieve a value of 65 m²/g. This specific surface can be between 55 and 65 m²/g.

The surface $S_{900°\ C./4\ h}$ may be at least 60 m²/g, more particularly at least 65 m²/g. The surface $S_{900°\ C./4\ h}$ may be at least 80 m²/g when the mixed oxide has never been subjected to a temperature of greater than or equal to 900° C. It is possible to achieve a value of 85 m²/g. This specific surface may be between 60 and 85 m²/g.

As regards the process for the preparation of the mixed oxide according to the invention, this comprises the following steps:

(a1) an aqueous solution of cerium nitrate and an aqueous solution of zirconium nitrate are introduced into a stirred vessel containing a basic aqueous solution;

(a2) an aqueous solution of lanthanum nitrate and of nitrate of the rare earth metal (REM) optionally present in the mixed oxide is subsequently introduced into the mixture formed in step (a1), kept stirred;

(a3) the suspension obtained at the end of step (a2) is heated under stirring;

(a4) a templating agent is subsequently introduced into the suspension obtained in the preceding step;

(a5) optionally, the suspension is filtered and the precipitate is washed;

(a6) the precipitate obtained at the end of step (a5) is calcined at a temperature of between 700° C. and 1100° C. to give the mixed oxide;

(a7) the mixed oxide obtained in step (a6) may optionally be ground.

In step (a1), use is made of a solution comprising zirconium nitrate and cerium nitrate (subsequently denoted by CZ-nitrate solution). In order to prepare such a solution, crystalline zirconyl nitrate may be dissolved in water. It is also possible to dissolve zirconium basic carbonate or zirconium hydroxide with nitric acid. This acid attack may preferably be carried out with a $NO_3^-/Zr$ molar ratio of between 1.7 and 2.3. In the case of zirconium carbonate, this ratio may be between 1.7 and 2.0. Thus, a usable zirconium nitrate solution, resulting from such an attack, may have a concentration, expressed as $ZrO_2$, of between 260 and 280 g/l. For example, the zirconium nitrate solution used in examples 1-16, resulting from such an attack, exhibits a concentration of 266 g/l.

For the source of cerium, it is possible to use, for example, a $Ce^{IV}$ salt, such as the nitrate, or ceric ammonium nitrate, which are particularly highly suitable here. Ceric nitrate is preferably used. An aqueous ceric nitrate solution may, for example, be obtained by reaction of nitric acid with a hydrated ceric oxide prepared conventionally by reaction of a solution of a cerous salt, for example cerous nitrate, and of an ammonia solution in the presence of aqueous hydrogen peroxide solution. Use may also be made, preferably, of a ceric nitrate solution obtained according to the process of electrolytic oxidation of a cerous nitrate solution as described in the document FR-A-2 570 087, which constitutes in this instance an advantageous starting material. It is possible to obtain, with this process, a ceric nitrate solution with a $Ce^{IV}$/total amount of Ce molar ratio of greater than or equal to 0.90, which may constitute an advantageous starting material. Thus, a usable ceric nitrate solution, resulting from this process, may have a concentration, expressed as $CeO_2$, of between 250 and 265 g/l. For example, the ceric nitrate solution used in examples 1-16, resulting from this process, exhibits a concentration of 259 g/l.

The aqueous solution of cerium nitrate and of zirconium nitrate may exhibit a certain initial free acidity which may be adjusted by the addition of a base or of an acid. It is, however, equally possible to use an initial solution of cerium and zirconium salts effectively exhibiting a certain free acidity as mentioned above, and solutions which will have been more or less intensively neutralized beforehand. This neutralization may be carried out by addition of a basic compound to the abovementioned mixture so as to limit this acidity but while avoiding precipitation. This basic compound may, for example, be an ammonia solution or even a solution of alkali metal (sodium, potassium, and the like) hydroxides. Use may advantageously be made of an ammonia solution.

It should be noted that, when the starting mixture contains $Ce^{III}$, it is preferable to involve an oxidizing agent, for example aqueous hydrogen peroxide solution, in the course of the process. This oxidizing agent may be used by being added to the reaction mixture of step (a1).

It is advantageous to use salts with a purity of at least 99.5% by weight and more particularly of at least 99.9% by weight.

The CZ-nitrate solution may be obtained by dissolution, in water, of the cerium and zirconium compounds in any order or else by mixing two solutions of nitrates.

In step (a1), the CZ-nitrate solution is introduced into a stirred vessel containing a basic aqueous solution, so as to react the basic compound and the cerium and zirconium compounds. The basic compound dissolved in the basic aqueous solution may be a hydroxide, for example an alkali metal or alkaline earth metal hydroxide. Use may also be made of secondary, tertiary or quaternary amines, as well as of ammonia. As in the examples, use may be made of an aqueous ammonia solution. As in example 1, use may be made of an aqueous ammonia solution, for example with a concentration of 12 mol/l.

The basic compound may be used with a stoichiometric excess in order to provide for optimum precipitation of all the cations. The stoichiometric excess is preferably at least 40 molar %, with respect to all of the cations present in the CZ-nitrate solution and also in the solution of lanthanum nitrate and of nitrate(s) of the rare earth metal(s) (REM(s)) optionally present in the mixed oxide which is added in step (a2).

The following step (a2) consists in bringing together the medium resulting from the preceding step (a1) and an aqueous solution of lanthanum nitrate and, if appropriate, of the nitrate of the rare earth metal(s) (REM(s)) optionally present in the mixed oxide.

This step is carried out under reduced stirring with respect to the stirring of step (a1). For example, the stirring rate used in step (a2) is 25 rpm in order to obtain the mixed oxides according to the invention of examples 1-16. At this rate, the stirring has to make it possible to control the dispersion based on lanthanum and on the rare earth metal(s) other than cerium and lanthanum within the reaction mixture comprising the precipitate of step (a1). With reference to the mechanical stirring power P, which is a macroscopic quantity representative of the quality of the mixing, it is possible, for example, to operate at a mechanical stirring power $P(a2)$ used during step (a2) such that the ratio $P(a2)/P(a1)$ is less than or equal to 0.10, even less than 0.05. This ratio may be between 0.0001 and 0.05. The adjusting of the process to a new configuration may require modifying, by successive tests, the rate of step (a2) in order to obtain the mixed oxide of the invention.

A suspension of a precipitate is obtained at the end of step (a2).

The following step (a3) of the process is the stage of heating the precipitate suspension obtained in step (a2). This heating may be carried out directly on the reaction mixture obtained at the end of step (a2) or on a suspension obtained after separating the precipitate from the reaction mixture of step (a2), optional washing of the precipitate and placing the precipitate back in water. The suspension may be heated to a temperature of at least 100° C. and more particularly still of at least 130° C., indeed even of at least 150° C. The temperature may be between 100° C. and 200° C., more particularly between 130° C. and 200° C. It may, for example, be between 100° C. and 160° C. The heating operation may be carried out by introducing the liquid medium into a closed reactor (of the autoclave type). Under the temperature conditions given above, and in an aqueous medium, it may thus be specified, by way of illustration, that the pressure in the closed reactor may vary between a value greater than 1 bar ($10^5$ Pa) and 165 bar ($1.65 \times 10^7$ Pa), preferably between 5 bar ($5 \times 10^5$ Pa) and 165 bar ($1.65 \times 10^7$ Pa). It is also possible to carry out the heating in an open reactor for the temperatures close to 100° C. The heating may be carried out either under air or under an atmosphere of inert gas, preferably nitrogen.

The duration of the heating may vary within wide limits, for example between 1 and 48 h, preferably between 1 and 24 h. Likewise, the rise in temperature is produced at a rate which is not critical and it is thus possible to reach the set reaction temperature by heating the medium, for example, for between 30 min and 4 h, these values being given only by way of indication.

It is possible to carry out several heating operations. Thus, the precipitate obtained after the heating step and optionally a washing operation may be resuspended in water and then another heating operation may be carried out on the medium thus obtained. This other heating operation is carried out under the same conditions as those which were described for the first.

The following step (a4) of the process consists in adding a templating agent to the precipitate resulting from the preceding step, the function of which templating agent is to control the porosity of the mixed oxide. A templating agent comprises polar chemical groups which interact with the chemical groups at the surface of the precipitate. The templating agent is removed subsequent to the calcination step.

The templating agent may be chosen from anionic surfactants, nonionic surfactants, polyethylene glycols and carboxylic acids and their salts, and also surfactants of the carboxymethylated fatty alcohol ethoxylate type. As regards this additive, reference may be made to the teaching of the application WO 98/45212 and use may be made of the surfactants described in this document. Mention may be made, as surfactants of the anionic type, of ethoxycarboxylates, ethoxylated fatty acids, sarcosinates, phosphate esters, sulfates, such as alcohol sulfates, alcohol ether sulfates and sulfated alkanolamide ethoxylates, or sulfonates, such as sulfosuccinates, alkylbenzenesulfonates or alkylnaphthalenesulfonates.

Mention may be made, as nonionic surfactants, of acetylenic surfactants, alcohol ethoxylates, alkanolamides, amine oxides, ethoxylated alkanolamides, long-chain ethoxylated amines, ethylene oxide/propylene oxide copolymers, sorbitan derivatives, ethylene glycol, propylene glycol, glycerol, polyglyceryl esters and their ethoxylated derivatives, alkylamines, alkylimidazolines, ethoxylated oils and alkylphenol ethoxylates. Mention may in particular be made of the products sold under the Igepal®, Dowanol®, Rhodamox® and Alkamide® brands.

As regards the carboxylic acids, use may in particular be made of aliphatic mono- or dicarboxylic acids and, among these, more particularly of saturated acids. Mention may thus in particular be made of formic, acetic, propionic, butyric, isobutyric, valeric, caproic, caprylic, capric, lauric, myristic or palmitic acid. Mention may be made, as dicarboxylic acids, of oxalic, malonic, succinic, glutaric, adipic, pimelic, suberic, azelaic and sebacic acids. Use may also be made of fatty acids and more particularly of saturated fatty acids. They may in particular be saturated linear acids of formula $CH_3$—$(CH_2)_m$—$COOH$, m being an integer between 6 and 20, more particularly between 9 and 15. The salts of all the acids mentioned may also be used, in particular the ammonium salts. Mention may more particularly be made, by way of example, of lauric acid and ammonium laurate.

Finally, it is possible to use a surfactant which is chosen from those of the carboxymethylated fatty alcohol ethoxylate type. Product of the carboxymethylated fatty alcohol ethoxylate type is understood to mean the products composed of ethoxylated or propoxylated fatty alcohols comprising, at the chain end, a $CH_2$—$COOH$ group. These products may correspond to the formula: $R_1$—O—$(CR_2R_3$—$CR_4R_5$—$O)_n$—$CH_2$—$COOH$ in which $R_1$ denotes a saturated or unsaturated carbon chain, the length of which is generally at most 22 carbon atoms, preferably at least 12 carbon atoms; $R_2$, $R_3$, $R_4$ and $R_5$ may be identical and represent hydrogen or else $R_2$ may represent a $CH_3$ group and $R_3$, $R_4$ and $R_5$ represent hydrogen; and n as a nonzero integer which may range up to 50 and more particularly between 5 and 15, these values being inclusive. It should be noted that a surfactant may be composed of a mixture of products of the above formula for which $R_1$ may be saturated and unsaturated respectively or else products comprising both $CH_2$—$CH_2$—O— and —$C(CH_3)$—$CH_2$—O— groups.

The addition of the templating agent may be carried out in two ways. It may be added directly to the suspension resulting from step (a3). In this case, it is preferably added to a suspension, the temperature of which is at most 60° C. It may also be added to the solid precipitate after separation of the latter by any known means from the medium in which the heating took place.

The amount of templating agent used, expressed as percentage by weight of templating agent with respect to the mixed oxide, is generally between 5% and 100%, more particularly between 15% and 60%.

According to another advantageous alternative form of the invention, before carrying out the final step of the process (calcination step), the precipitate is washed after having separated it from the medium in which it occurred in suspension. This washing operation may be carried out with water, preferably with water at basic pH, for example aqueous ammonia solution.

In step (a6), the recovered precipitate is subsequently calcined in order to give the mixed oxide according to the invention. This calcination makes it possible to develop the crystallinity of the product formed. The specific surface of the product decreases as the calcination temperature employed increases. The calcination is generally carried out under air but a calcination carried out, for example, under an inert gas or under a controlled atmosphere (oxidizing or reducing) is not excluded. The calcination temperature is generally between 700° C. and 1100° C. As the mixed oxide exhibits a good thermal resistance, it is possible to carry out the calcination at a temperature which is greater than 825° C., indeed even greater than 900° C., indeed even greater than 950° C. This temperature may be between 825° C. and 1100° C., indeed even between 950° C. and 1100° C. The duration of the calcination is not critical and depends on the temperature. Purely by way of indication, it may be at least 2 h, more particularly between 2 and 4 h.

During a step (a7), the mixed oxide which is obtained in step (a6) may be optionally ground in order to obtain powders with the desired particle size. For example, a hammer mill may be used. The powder of the mixed oxide can exhibit a mean diameter $d_{50}$, determined by laser diffraction, over a distribution by volume, of between 0.5 and 50.0 μm.

The preparation of the mixed oxide according to the invention may be based on the conditions of examples 1-4.

The invention also relates to a mixed oxide capable of being obtained by the process which has just been described.

As regards the use of the mixed oxide according to the invention, this comes within the field of motor vehicle pollution control catalysis. The mixed oxide according to the invention may be used in the manufacture of a catalytic converter, the role of which is to treat motor vehicle exhaust gases. The catalytic converter comprises a catalytically active coating layer prepared from the mixed oxide and deposited on a solid support. The role of the coating layer is to convert, by chemical reactions, certain pollutants of the exhaust gas, in particular carbon monoxide, nonincinerated hydrocarbons and nitrogen oxides, into products which are less harmful to the environment.

The chemical reactions involved may be the following ones:

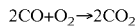

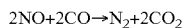

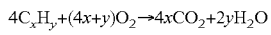

The solid support may be a metal monolith, for example FeCralloy, or be made of ceramic. The ceramic may be cordierite, silicon carbide, alumina titanate or mullite. A commonly used solid support consists of a monolith, generally cylindrical, comprising a multitude of small parallel channels having a porous wall. This type of support is often made of cordierite and exhibits a compromise between a high specific surface and a limited pressure drop.

The coating layer, commonly known as "washcoat", is deposited at the surface of the solid support. The coating layer is formed from a composition comprising the mixed oxide as a mixture with at least one mineral material. The mineral material may be chosen from alumina, titanium oxide, cerium oxide, zirconium oxide, silica, spinels, zeolites, silicates, crystalline silicoaluminum phosphates or crystalline aluminum phosphates. The composition may also comprise other additives which are specific to each formulator: $H_2S$ scavenger, organic or inorganic modifier having the role of facilitating the coating, colloidal alumina, and the like. The coating layer thus comprises such a composition. Alumina is a commonly employed mineral material, it being possible for this alumina to optionally be doped, for example with an alkaline earth metal, such as barium. The coating layer also comprises at least one dispersed precious metal (such as, for example, Pt, Rh or Pd). The amount of precious metal is generally between 1 and 400 g, with respect to the volume of the monolith, expressed in $ft^3$. The precious metal is catalytically active.

In order to disperse the precious metal, it is possible to add a salt of the precious metal to a suspension of the mixed oxide or of the mineral material or of the mixture formed of the mixed oxide and of the mineral material. The salt may, for example, be a chloride or a nitrate of the precious metal (for example $Rh^{III}$ nitrate). The water is removed from the suspension, in order to fix the precious metal, the solid is dried and it is calcined under air at a temperature generally of between 300 and 800° C. An example of precious metal dispersion may be found in example 1 of U.S. Pat. No. 7,374,729.

The coating layer is obtained by the application of the suspension to the solid support. The coating layer thus exhibits a catalytic activity and may act as pollution-control catalyst. The pollution-control catalyst may be used to treat exhaust gases from internal combustion engines. The catalytic systems and the mixed oxides of the invention may finally be used as $NO_x$ traps or for promoting the reduction of $NO_x$, even in an oxidizing environment.

For this reason, the invention also relates to a process for the treatment of exhaust gases from internal combustion engines which is characterized in that use is made of a catalytic converter comprising a coating layer, which coating layer is as described above.

EXAMPLES

The specific surfaces are determined automatically using a Tristar II 3020 device from Micromeritics on samples while conforming to the instructions recommended by the manufacturer. The samples are pretreated under vacuum at 300° C. for 15 min. It is advisable to desorb the entities possibly adsorbed at the surface. The measurement is carried out on 5 points in the range of relative pressures $p/p_0$ extending from 0 to 0.3 inclusive. The equilibrium time for each point is 5 s.

For the mercury porosity measurements, use was made of a Micromeritics Autopore IV 9500 device provided with a powder penetrometer by conforming to the instructions recommended by the manufacturer. The following parameters may be used: penetrometer used: 3.2 ml; volume of the capillary: 0.412 ml; max. pressure ("head pressure"): 4.68 psi; contact angle: 130°; surface tension of the mercury: 485 dynes/cm; density of the mercury: 13.5335 g/ml. At the start of the measurement, a vacuum of 50 mm Hg is applied to the sample for 5 min. The equilibrium times are as follows: range of the low pressures (1.3-30 psi): 20 s-range of the high pressures (30-60 000 psi): 30 s. Prior to the measurement, the samples are degassed in an oven at 100° C. for a minimum of 15 min.

The compositions are given as percentages by weight of the oxides $ZrO_2$, $CeO_2$, $REM_2O_3$ (e.g., $La_2O_3$, $Y_2O_3$, $Nd_2O_3$) and $Pr_2O_6$.

Example 1: Preparation of 5 kg of Mixed Oxide $ZrO_2$ (60%)-$CeO_2$ (30%)-$La_2O_3$ (5%)-$Y_2O_3$ (5%)

A solution of cerium nitrate and zirconium nitrate is prepared by introducing, into a vessel, 95.43 liters of water, 11.3 liters of an aqueous zirconium nitrate solution ($[ZrO_2]$= 266 g/l; density=1.408 kg/l) and also 5.8 liters of an aqueous ceric nitrate solution ($[CeO_2]$=259 g/l; density=1.439 kg/l). An aqueous solution of lanthanum nitrate and yttrium nitrate is also prepared by introducing, into another vessel, 10.77 liters of water, 0.53 liter of a lanthanum nitrate solution ($[La_2O_3]$=472.5 g/l; density=1.711 kg/l) and 1.2 liters of an yttrium nitrate solution ($[Y_2O_3]$=208.5 g/l; density=1.391 kg/l).

An ammonia solution (12 l at 12 mol/l) is introduced with stirring into a reactor of approximately 250 liters equipped with a stirrer having inclined blades and the solution is subsequently made up with distilled water so as to obtain a total volume of 125 liters of basic aqueous solution. This makes it possible to provide a stoichiometric excess of ammonia of 40 molar %, with respect to the cations which are present in the two solutions described above.

The two solutions prepared above are kept continually stirred. The solution of cerium nitrate and zirconium nitrate is introduced over 45 min into the stirred reactor which contains the ammonia solution, the stirring of which is adjusted to a rate of 200 rpm (80 Hz). The solution of lanthanum nitrate and yttrium nitrate is then introduced over 15 min into the stirred reactor, the stirring of which is this time adjusted to 25 rpm (10 Hz). A precipitate suspension is obtained.

The suspension is poured into a stainless steel autoclave equipped with a stirrer. The suspension is heated with stirring at 150° C. for 2 h. It is then left to cool down to a temperature of less than 60° C. and 1.65 kg of lauric acid are added to the suspension. The suspension is kept stirred for 1 h.

The suspension is then filtered and then the precipitate is washed with aqueous ammonia solution of pH=9.5 in a proportion of one times the volume of the filtration mother liquors (washing is carried out with 250 liters of aqueous ammonia solution). The solid product obtained is subsequently calcined under air at 950° C. for 3 h in order to recover approximately 5 kg of mixed oxide.

Example 4: Preparation of 5 kg of Mixed Oxide $ZrO_2$ (59%)-$CeO_2$ (35.5%)-$La_2O_3$ (5.5%)

A solution of cerium nitrate and zirconium nitrate is prepared by introducing, into a vessel, 100.3 liters of water, 11.1 liters of a zirconium nitrate solution ($[ZrO_2]$=266 g/l; density=1.408 kg/l) and also 6.8 liters of a ceric nitrate solution ($[CeO_2]$=259 g/l; density=1.439 kg/l). An aqueous solution of lanthanum nitrate and yttrium nitrate is also prepared by introducing, into another vessel, 6.29 liters of water and 0.58 liter of an aqueous lanthanum nitrate solution ($[La_2O_3]$=472.5 g/l; density=1.711 kg/l).

An ammonia solution (12 liters at 12 mol/l) is introduced with stirring into a reactor of 250 liters equipped with a stirrer having inclined blades and the solution is subsequently made up with distilled water so as to obtain a total volume of 125 liters of basic aqueous solution. This makes it possible to provide a stoichiometric excess of ammonia of 40 molar %, with respect to the cations which are present in the two solutions described above.

The two solutions prepared above are kept continually stirred. The solution of cerium nitrate and zirconium nitrate is introduced over 45 min into the stirred reactor which contains the ammonia solution, the stirring of which is adjusted to a rate of 200 rpm (80 Hz). The solution of lanthanum nitrate and yttrium nitrate is then introduced over 15 min into the stirred reactor, the stirring of which is this time adjusted to 25 rpm (10 Hz). A precipitate suspension is obtained.

The suspension is poured into a stainless steel autoclave equipped with a stirrer. The suspension is heated with stirring at 150° C. for 2 h. It is then left to cool down to a temperature of less than 60° C. and 1.65 kg of lauric acid are added to the suspension. The suspension is kept stirred for 1 h.

The suspension is then filtered and then the precipitate is washed with aqueous ammonia solution of pH=9.5 in a proportion of one times the volume of the filtration mother liquors (washing is carried out with 250 liters of aqueous ammonia solution). The solid product obtained is subsequently calcined under air at 950° C. for 3 h in order to recover approximately 5 kg of mixed oxide.

Examples 2-3 and 5-16: the mixed oxides according to these examples were prepared in the same way as for example 1, so as to recover 5 kg of mixed oxide. More specifically, on the one hand, an aqueous solution of cerium nitrate and zirconium nitrate is prepared and, the other hand, an aqueous solution of lanthanum nitrate and optionally of nitrate of the rare earth metal other than cerium and lanthanum is prepared. The total volume of the two solutions is 125 liters. The aqueous solution of cerium nitrate and zirconium nitrate is introduced, over 45 min, into the same reactor as that of example 1 containing 125 liters of an aqueous ammonia solution, the stirring of which is adjusted to a rate of 200 rpm (80 Hz). The amount of ammonia is such that there is a stoichiometric excess of ammonia of 40 molar %, with respect to the cations which are present in the two solutions of nitrates. The other solution of nitrates is then introduced over 15 min into the stirred reactor, the stirring of which is this time adjusted to 25 rpm (10 Hz). A precipitate suspension is obtained.

The suspension is poured into a stainless steel autoclave equipped with a stirrer. The suspension is heated with stirring at 150° C. for 2 h. It is then left to cool down to a temperature of less than 60° C. and 1.65 kg of lauric acid are added to the suspension. The suspension is kept stirred for 1 h.

The suspension is then filtered and then the precipitate is washed with 250 liters of aqueous ammonia solution of pH=9.5. The solid product obtained is subsequently calcined under air at a calcination temperature of at least 825° C. for 3 h in order to recover approximately 5 kg of mixed oxide.

Comparative Example 17: 15 kg of Mixed Oxide $ZrO_2$ (60%)-$CeO_2$ (30%)-$La_2O_3$ (5%)-$Y_2O_3$ (5%) are Prepared A solution of nitrates is prepared by introducing, into a vessel, 32.4 liters of an aqueous zirconium nitrate solution ([$ZrO_2$]=278 g/l; density=1.413 kg/l), 17.2 liters of an aqueous cerium nitrate solution ([$CeO_2$]=262 g/l; density=1445 kg/l), 1.59 liters of an aqueous lanthanum nitrate solution ([$La_2O_3$]=472.5 g/l; density=1.711 kg/l) and 3.5 liters of an aqueous yttrium nitrate solution ([$Y_2O_3$]=217 g/l; density=1.39 kg/l). The solution is subsequently made up with distilled water, so as to obtain 70.4 liters of the solution of nitrates.

34 liters of an ammonia solution (12 mol/l) are introduced into the stirred reactor of example 1 and the solution is subsequently made up with distilled water so as to obtain a total volume of 125 liters.

The solution of nitrates is introduced into the reactor with continual stirring. The solution obtained is placed in a stainless steel autoclave equipped with a stirrer.

The temperature of the medium is brought to 150° C. for 2 hours with stirring. After cooling to a temperature of less than 60° C., 4.95 kg of lauric acid are added to the suspension thus obtained. The suspension is kept stirred for 1 h.

The suspension is then filtered and then the precipitate is washed with aqueous ammonia solution in a proportion of one times the volume of the filtration mother liquors. The product obtained is subsequently brought to 825° C. for 3 h in order to recover approximately 15 kg of mixed oxide.

Comparative Example 18: 13 kg of Mixed Oxide $ZrO_2$ (60%)-$CeO_2$ (30%)-$La_2O_3$ (5%)-$Y_2O_3$ (5%) are Prepared An aqueous solution of cerium nitrate and zirconium nitrate is prepared by introducing, into a vessel, 52.32 liters of water, 30.2 liters of an aqueous zirconium nitrate solution ([$ZrO_2$]=258 g/l; density=1.38 kg/l) and also 14.9 liters of an aqueous cerium nitrate solution ([$CeO_2$]=261 g/l; density=1.445 kg/l). An aqueous solution of lanthanum nitrate and yttrium nitrate is also prepared by introducing, into another vessel, 6.34 liters of water, 1.38 liters of an aqueous lanthanum nitrate solution ([$La_2O_3$]=472.5 g/l; density=1.711 kg/l) and 3.1 liters of an aqueous yttrium nitrate solution ([$Y_2O_3$]=208 g/l; density=1.391 kg/l).

An ammonia solution (30 liters at 12 mol/l) is introduced with stirring into the same reactor as for example 1 and the solution is subsequently made up with distilled water so as to obtain a total volume of 108.3 liters of basic solution. This makes it possible to provide a stoichiometric excess of ammonia of 40 molar %, with respect to the cations to be precipitated.

The two solutions prepared above are kept continually stirred. The solution of cerium nitrate and zirconium nitrate is introduced over 45 min into the stirred reactor which contains the ammonia solution, the stirring of which is adjusted to a rate of 125 rpm (50 Hz). The solution of lanthanum nitrate and yttrium nitrate is then introduced over 15 min and the stirring in the stirred reactor, the stirring of which is this time adjusted to 100 rpm (40 Hz). A precipitate suspension is obtained.

The suspension is poured into a stainless steel autoclave equipped with a stirrer. The suspension is heated with stirring at 150° C. for 2 h. Then, after cooling to a temperature of less than 60° C., 4.29 kg of lauric acid are added to the suspension. The suspension is kept stirred for 1 h.

The suspension is then filtered and then the precipitate is washed with aqueous ammonia solution of pH=9.5 in a proportion of one times the volume of the filtration mother liquors. The suspension is then filtered and then the precipitate is washed with water. The product obtained is subsequently calcined under air at 825° C. for 3 h in order to recover the 13 kg.

The oxides prepared are described in table 1. The mixed oxides of examples 1-16 illustrate the invention and were prepared according to the process of the invention under the conditions of example 1. For their part, the mixed oxides of examples 17-22 were prepared according to the process of comparative example 17 or of comparative example 18. $T_{cal}$ denotes the temperature at which the precipitates recovered are calcined (step (a6) of the process). In all cases, the calcination in this step lasts 3 h. $S_{Tcal/3\ h}$ thus denotes the BET specific surface of the "fresh" mixed oxide as obtained at the end of the preparation process.

The mixed oxide of example 8 may be compared directly with that of comparative example 21 as the two mixed oxides have the same proportions of oxides and were obtained after calcination at the same temperature of 825° C. (table I).

TABLE I

|  | Ex. 8 (inv.) | Ex. 21 (comp.) |
|---|---|---|
| $S_{825°\ C./3\ h}$ (m$^2$/g) | 87 | 83 |
| $S_{900°\ C./4\ h}$ (m$^2$/g) | 83 | 70 |
| $S_{1100°\ C./4\ h}$ (m$^2$/g) | 31 | 27 |
| $D_{p,\ 1100°\ C./4\ h}$ (nm) | 28 | 51 |
| R | 0.90 | 0.45 |
| $D_{p,\ 1100°\ C./4\ h}$-$D_{p,\ 900°\ C./4\ h}$ (nm) | 10 | 23 |

It may be observed that the mixed oxide of example 8 exhibits higher specific surfaces, a smaller diameter $D_{p,1100°\ C./4\ h}$ and a higher R factor than for that of comparative example 21. Furthermore, the variation $D_{p,\ 1100°\ C./4\ h}$-$D_{p,\ 900°\ C./4\ h}$ is reduced.

The mixed oxide of example 10 may be compared directly with that of comparative example 22 as the two mixed oxides exhibit the same proportions of oxides and were obtained after calcination at the same temperature of 950° C.

TABLE II

|  | Ex. 10 (inv.) | Ex. 22 (comp.) |
|---|---|---|
| $S_{950°\ C./3\ h}$ (m$^2$/g) | 71 | 60 |
| $S_{1100°\ C./4\ h}$ (m$^2$/g) | 34 | 33 |
| $D_{p,\ 1100°\ C./4\ h}$ (nm) | 30 | 47 |
| R | 0.62 | 0.44 |

It may be observed that the mixed oxide of example 10 exhibits higher specific surfaces, a smaller diameter $D_{p,1100°\ C./4\ h}$ and a higher R factor than that of comparative example 22.

Example 19: Impregnation of Mixed Oxides with a $Rh^{III}$ Salt

The mixed oxides of examples 1, 17 and 18 (having the same proportions of Zr—Ce—La—Y—Nd oxides 60-30-5-6-0) are impregnated with $Rh^{III}$ nitrate. The mixed oxide is brought into contact with a solution of $Rh^{III}$ nitrate, the volume of this solution being greater than the total pore volume, the water is then evaporated and calcination is carried out at 500° C. for 4 h. The proportion of rhodium with respect to the catalyst in its entirety is 0.1% by weight.

Example 20: Aging of the Impregnated Mixed Oxides of Example 19

The aging is carried out on the aging test bench in a redox environment, with an alternating injection every 5 min of 2% CO and 2% $O_2$ in the presence of 10% $H_2O$ (the % values for CO, $O_2$ and $H_2O$ are given by volume). The gas flow rate used is 70 cc/min under STP conditions and the weight of the impregnated mixed oxide tested is 2.5 g. The final injection is oxidizing (2% $O_2$). The aging temperature is 1100° C. for a total duration of 6 hours.

Temperature-Programmed Reduction Device

The temperature-programmed reduction (TPR) makes it possible to determine the volume of hydrogen consumed by a sample when the latter is subjected to a programmed temperature under a gas stream itself also controlled. The device consists of a series of solenoid valves making it possible to control the passage of the gases, of a series of bulk flow meters making it possible to fix the flow rates in the different lines, of a series of selector valves making it possible to direct the gas streams, of a (U-shaped) quartz reactor containing the sample and connected to the gas manifolds (down flow fluidized bed reactor, the temperature is taken by a thermocouple located in the reactor), of an oven in which the reactor is placed, of an $H_2O$ trap and of a katharometer (TCD) which makes it possible to analyse the constituents of the gas mixture.

A computer manages the automatic functionings with the Micromeritics Autochem II 2920 software and makes it possible to collect in real time the data relating to the experiment under way. It also carries out the processing in order to translate these data into curves by virtue of the Grams/32 software.

Conditions of the Analyses by TPR

The TPR is carried out by bringing the sample to 900° C. under a stream of hydrogen ($H_2$/Ar comprising 10 vol % $H_2$) according to a temperature gradient of 10° C./min from ambient temperature, after having brought the sample to 500° C. in the presence of 10% $O_2$.

Results with Regard to the Impregnated Mixed Oxides of Example 19 (Table III)

TABLE III

| Mixed oxide | $T_{max}$ (° C.) | Volume $H_2$ consumed from 60 to 500° C. (ml/g) |
|---|---|---|
| Ex. 1 (inv.) | 100-150-260 | 13.5 |
| Ex. 17 (comp.) | 148 | 9.7 |
| Ex. 18 (comp.) | 150-260 | 10.9 |

Results with Regard to the Impregnated and Aged Mixed Oxides of Example 20 (Table IV)

TABLE IV

| Mixed oxide | $T_{max}$ (° C.) | Volume $H_2$ consumed from 60 to 500° C. (ml/g) |
|---|---|---|
| Ex. 1 (inv.) | 148.7 | 12.6 |
| Ex. 17 (comp.) | 155.0 | 10.1 |
| Ex. 18 (comp.) | 147.0 | 11.9 |

It is found that the volume of hydrogen consumed is higher for the samples obtained from the mixed oxide according to the invention, whether with regard to the nonaged product (table III) or the aged product (table IV).

| | % by weight of the oxides of the elements below | | | | | Process | | After calcination at 900° C./4 h | | After calcination at 1000° C./4 h | After calcination at 1100° C./4 h | | |
|---|---|---|---|---|---|---|---|---|---|---|---|---|---|
| Ex. | Zr | Ce | La | Y | Nd or Pr | Process used | $T_{cal}$ (° C.) | $S_{Tcal/3h}$ (m²/g) | $D_{p, 900° C./4h}$ (nm) | $S_{900° C./4h}$ (m²/g) | $S_{1000° C./4h}$ (m²/g) | $S_{1100° C./4h}$ (m²/g) | $D_{p, 1100° C./4h}$ (nm) | R |
| 1 | 60 | 30 | 5 | 5 | 0 | Ex. 1 | 950 | 69 | 21 | 69 | 58 | 31 | 24 | 0.73 |
| 2 | 55 | 35 | 8 | 2 | 0 | Ex. 1 | 950 | 69 | 23 | 68 | 58 | 30 | 26 | 0.71 |
| 3 | 59 | 35.5 | 5.5 | 0 | 0 | Ex. 1 | 950 | 69 | 23 | 63 | 55 | 30 | 26 | 0.68 |
| 4 | 59 | 35.5 | 5.5 | 0 | 0 | Ex. 1 | 1050 | 61 | 28 | | 54 | 31 | 28 | 0.76 |
| 5 | 55 | 35 | 5 | 5 | 0 | Ex. 1 | 950 | 68 | 24 | 68 | 59 | 32 | 26 | 0.73 |
| 6 | 50 | 35 | 5 | 10 | 0 | Ex. 1 | 950 | 72 | 21 | 72 | 64 | 35 | 28 | 0.75 |
| 7 | 50 | 35 | 5 | 10 | 0 | Ex. 1 | 1050 | 52 | 29 | | | 38 | 29 | 0.88 |
| 8 | 50 | 40 | 5 | 5 | 0 | Ex. 1 | 825 | 87 | 18 | 83 | 61 | 31 | 28 | 0.90 |
| 9 | 50 | 40 | 5 | 5 | 0 | Ex. 1 | 950 | 69 | 23 | 69 | 58 | 33 | 28 | 0.82 |
| 10 | 60 | 24 | 3.5 | 12.5 | 0 | Ex. 1 | 950 | 71 | 20 | | 59 | 34 | 30 | 0.62 |
| 11 | 60 | 24 | 3.5 | 12.5 | 0 | Ex. 1 | 1060 | 50 | 30 | | | 39 | 30 | 0.64 |
| 12 | 65 | 20 | 2 | 8 | Nd 5 | Ex. 1 | 1060 | 44 | 30 | | | 32 | 30 | 0.79 |
| 13 | 65 | 20 | 2 | 8 | Nd 5 | Ex. 1 | 950 | 69 | 20 | 69 | 63 | 32 | 29 | 0.80 |
| 14 | 75 | 10 | 2 | 8 | Nd 5 | Ex. 1 | 950 | 76 | 17 | | 56 | 32 | 30 | 0.75 |
| 15 | 75 | 10 | 2 | 8 | Nd 5 | Ex. 1 | 1060 | 43 | 34 | | | 35 | 34 | 0.75 |
| 16 | 50 | 35 | 2 | 8 | Pr 5 | Ex. 1 | 950 | 69 | | 69 | 58 | 31 | | |
| Comp. 17 | 60 | 30 | 5 | 5 | 0 | Comp. 17 | 825 | 67 | 34 | | 51 | 24 | 36 | 0.63 |
| Comp. 18 | 60 | 30 | 5 | 5 | 0 | Comp. 18 | 825 | 76 | 24 | 72 | 55 | 27 | 40 | 0.59 |
| Comp. 19 | 55 | 35 | 8 | 2 | 0 | Comp. 18 | 825 | 73 | 28 | 70 | 54 | 27 | 36 | 0.48 |
| Comp. 20 | 59 | 36 | 5.5 | 0 | 0 | Comp. 18 | 825 | 73 | 24 | 69 | 53 | 26 | 40 | 0.57 |
| Comp. 21 | 50 | 40 | 5 | 5 | 0 | Comp. 18 | 825 | 83 | 28 | 70 | 51 | 27 | 51 | 0.45 |
| Comp. 22 | 60 | 24 | 3.5 | 13 | 0 | Comp. 18 | 950 | 60 | 29 | | 52 | 33 | 47 | 0.44 |

The invention claimed is:

1. A mixed oxide of zirconium, of cerium, of lanthanum and optionally of at least one rare earth metal other than cerium and lanthanum (REM), the proportions by weight of these elements, expressed as oxide equivalent, with respect to the total weight of the mixed oxide being as follows:
   between 8% and 45% of cerium;
   between 1% and 10% of lanthanum;
   between 0% and 15% of the rare earth metal other than cerium and lanthanum;
   the remainder as zirconium,
   characterized in that the mixed oxide exhibits:
      after calcination at a temperature of 1100° C. for 4 hours, a BET specific surface of at least 30 m$^2$/g;
      after calcination at a temperature of 1000° C. for 4 hours, a BET specific surface of at least 55 m$^2$/g;
   characterized in that the derivative curve (dV/dlogD) obtained by mercury porosimetry on the mixed oxide after calcination at a temperature of 1100° C. for 4 hours exhibits, in the range of the pores with a diameter of less than or equal to 200 nm, a peak for which the maximum corresponds to a pore diameter, denoted $D_{p,1100° C./4 h}$, of between 24 and 34 nm, V and D respectively denoting the pore volume and the pore diameter;
   and characterized in that the ratio R is defined by:

$$R = \frac{V_1}{V_2}$$

in which:
   $V_1$ is the pore volume developed by the pores for which the diameter in nm is between ($D_{p,1100° C./4 h}$−15) and ($D_{p,1100° C./4 h}$+15);
   $V_2$ is the pore volume developed by the pores for which the diameter is less than or equal to 200 nm;
   $V_1$ and $V_2$ being determined by mercury porosimetry on the mixed oxide after calcination at 1100° C. for 4 h; and
   is greater than or equal to 0.60.

2. The mixed oxide as claimed in claim 1, characterized in that it also comprises hafnium.

3. The mixed oxide as claimed in claim 2, characterized in that the proportion by weight of hafnium in the mixed oxide is less than or equal to 2.5%, expressed as oxide equivalent with respect to the total weight of the mixed oxide.

4. The mixed oxide as claimed in claim 2, characterized in that the elements Ce, La, REM, Zr and Hf are present in the form of oxides, of hydroxides or of oxyhydroxides.

5. The mixed oxide as claimed in claim 1, consisting of the following elements:
   zirconium and optionally hafnium, cerium, lanthanum, yttrium; or
   zirconium and optionally hafnium, cerium, lanthanum, yttrium, neodymium; or
   zirconium and optionally hafnium, cerium, lanthanum, yttrium, praseodymium; or
   zirconium and optionally hafnium, cerium, lanthanum.

6. The mixed oxide as claimed in claim 1, further comprising tin in the oxide form $SnO_2$ in a proportion by weight, as oxide equivalent, with respect to the total weight of the mixed oxide, of strictly less than 1.0%.

7. The mixed oxide as claimed in claim 1, characterized in that the proportion by weight of the zirconium as oxide equivalent is, putting aside oxygen, greater than the proportion by weight as oxide equivalent of each of the other constituent elements of the mixed oxide.

8. The mixed oxide as claimed in claim 1, characterized in that the proportion by weight of the zirconium, expressed as oxide equivalent, is between 40% and 91%.

9. The mixed oxide as claimed in claim 1, characterized in that the rare earth metal other than cerium and lanthanum is chosen from yttrium, neodymium or praseodymium.

10. The mixed oxide as claimed in claim 1, not comprising a rare earth metal other than cerium and lanthanum.

11. The mixed oxide as claimed in claim 1, comprising only yttrium as rare earth metal other than cerium and lanthanum.

12. The mixed oxide as claimed in claim 1, comprising only two rare earth metals other than cerium and lanthanum.

13. The mixed oxide as claimed in claim 1, characterized in that the pore diameter $D_{p,1100° C./4 h}$ of the mixed oxide is between 24 nm and 30 nm, this upper value being excluded.

14. The mixed oxide as claimed in claim 1, characterized in that the derivative curve (dV/dlogD) obtained by mercury porosimetry on the mixed oxide after calcination at a temperature of 900° C. for 4 hours exhibits, in the range of the pores with a diameter of less than or equal to 200 nm, a peak for which the maximum corresponds to a pore diameter $D_{p,900° C./4 h}$ and such that the difference in absolute value $D_{p,1100° C./4 h} - D_{p,900° C./4 h}$ is less than or equal to 15 nm.

15. The mixed oxide as claimed in claim 1, exhibiting, after calcination at a temperature of 900° C. for 4 hours, a BET specific surface of at least 60 m$^2$/g.

16. The mixed oxide as claimed in claim 1, which is provided in the form of a powder having a mean diameter $d_{50}$ of between 0.5 and 50.0 μm, as determined by laser diffraction over a distribution by volume.

17. The mixed oxide as claimed in claim 1, characterized in that the derivative curve (dV/dlogD), obtained by mercury porosimetry on the mixed oxide after calcination at a temperature of 900° C. for 4 hours, does not exhibit two peaks within the range of the pores for which the diameter is less than or equal to 200 nm.

18. The mixed oxide as claimed in claim 1, characterized in that the ratio R is greater than or equal to 0.7.

19. A process for the preparation of the mixed oxide as claimed in claim 1, comprising the following steps:
   (a1) introducing an aqueous solution of cerium nitrate and of zirconium nitrate into a stirred vessel containing a basic aqueous solution to form a mixture;
   (a2) subsequently introducing an aqueous solution of lanthanum nitrate and of nitrate of the rare earth metal (REM) optionally present in the mixed oxide into the mixture formed in step (a1), while stirring, to form a suspension;
   (a3) heating the suspension obtained at the end of step (a2) while stirring;
   (a4) subsequently introducing a templating agent into the suspension obtained in the preceding step;
   (a5) filtering the suspension to obtain a precipitate and washing the precipitate;
   (a6) calcining the precipitate obtained at the end of step (a5) at a temperature of between 700° C. and 1100° C. to give the mixed oxide;
   (a7) optionally grinding the mixed oxide obtained in step (a6).

20. A composition comprising the mixed oxide as claimed in claim 1 and at least one mineral material.

21. The composition as claimed in claim 20, in which the mineral material is chosen from alumina, titanium oxide, cerium oxide, zirconium oxide, silica, spinels, zeolites, silicates, crystalline silicoaluminum phosphates or crystalline aluminum phosphates.

22. A catalytically active coating layer, deposited at the surface of a solid support, prepared from the mixed oxide as described in claim 1.

23. A catalytic converter for treating motor vehicle exhaust gases, comprising a coating layer as claimed in claim 22.

24. A process for the treatment of exhaust gases from internal combustion engines, the process comprising contacting the exhaust gases with a catalytic converter comprising a coating layer as claimed in claim 22.

25. A mixed oxide consisting of a mixture of oxides of zirconium, of cerium, of lanthanum, optionally of at least one rare earth metal other than cerium and lanthanum (REM) and optionally of hafnium, the proportions by weight of said oxides being as follows:
- between 8% and 45% of cerium oxide;
- between 1% and 10% of lanthanum oxide;
- between 0% and 15% of at least one rare earth metal oxide, the rare earth metal being other than cerium and lanthanum;
- between 0% and 2.5% of hafnium oxide;
- the remainder as zirconium oxide, characterized in that the mixed oxide exhibits:
- after calcination at a temperature of 1100° C. for 4 hours, a BET specific surface of at least 30 m²/g;
- after calcination at a temperature of 1000° C. for 4 hours, a BET specific surface of at least 55 m²/g;

characterized in that the derivative curve (dV/dlogD) obtained by mercury porosimetry on the mixed oxide after calcination at a temperature of 1100° C. for 4 hours exhibits, in the range of the pores with a diameter of less than or equal to 200 nm, a peak for which the maximum corresponds to a pore diameter, denoted $D_{p,1100° C./4 h}$, of between 24 and 34 nm, V and D respectively denoting the pore volume and the pore diameter;

and characterized in that the ratio R is defined by:

$$R = \frac{V_1}{V_2}$$

in which:
- $V_1$ is the pore volume developed by the pores for which the diameter in nm is between ($D_{p,1100° C./4 h}$ −15) and ($D_{p,1100° C./4 h}$ +15);
- $V_2$ is the pore volume developed by the pores for which the diameter is less than or equal to 200 nm;
- $V_1$ and $V_2$ being determined by mercury porosimetry on the mixed oxide after calcination at 1100° C. for 4 h; and
- is greater than or equal to 0.60.

26. The mixed oxide as claims in claim 25, characterized in that the ratio R is greater than or equal to 0.7.

* * * * *